United States Patent
Chan et al.

(10) Patent No.: US 8,193,664 B2
(45) Date of Patent: Jun. 5, 2012

(54) ELECTRICAL POWER-SAVING CONTROL APPARATUS, POWER SUPPLY INCLUDING THAT APPARATUS AND POWER-SAVING METHOD THEREOF

(75) Inventors: Chun-Kong Chan, Hsin Chuang (TW); Po-Yuan Yu, Hsin Chuang (TW)

(73) Assignee: Lien Chang Electronic Enterprise Co., Ltd., Hsin Chuang, Taipei County (TW)

( * ) Notice: Subject to any disclaimer, the term of this patent is extended or adjusted under 35 U.S.C. 154(b) by 212 days.

(21) Appl. No.: 12/622,025

(22) Filed: Nov. 19, 2009

(65) Prior Publication Data

US 2011/0115305 A1    May 19, 2011

(51) Int. Cl.
*H01H 31/10*  (2006.01)
*H01H 33/59*  (2006.01)
*H01H 47/00*  (2006.01)
*H01H 85/46*  (2006.01)
*H01H 19/14*  (2006.01)

(52) U.S. Cl. .................................................. 307/115
(58) Field of Classification Search ............. 307/105, 307/115, 125
See application file for complete search history.

(56) References Cited

U.S. PATENT DOCUMENTS

2011/0025217 A1 * 2/2011 Zhan et al. ............... 315/219
* cited by examiner

*Primary Examiner* — Jared Fureman
*Assistant Examiner* — Carlos Amaya
(74) *Attorney, Agent, or Firm* — Muncy, Geissler, Olds & Lowe, PLLC

(57) ABSTRACT

A power-saving control apparatus for reducing power consumption of a power supply is provided. The present invention includes a switching circuit and a rectifier circuit. The rectifier circuit rectifies an AC signal to a DC signal. The switching circuit controls either the AC signal or the DC signal as an input signal to an EMI filter of the power supply. Therefore, when the EMI filter receives the DC signal, the present invention achieves the effect of power-saving of the power supply.

10 Claims, 3 Drawing Sheets

US 8,193,664 B2

ELECTRICAL POWER-SAVING CONTROL APPARATUS, POWER SUPPLY INCLUDING THAT APPARATUS AND POWER-SAVING METHOD THEREOF

BACKGROUND OF THE INVENTION

1. Field of the Invention

The present invention relates to an electrical power-saving control apparatus, in particular, to a control apparatus for reducing power-consumption of an electrical power supply.

2. Description of Related Art

FIG. 1 illustrates the configuration of an electrical power supply 8 which includes of an EMI (Electromagnetic Interference, EMI) filter 80, a rectifier circuit 82, and a load 9. The EMI filter 80 is located at the input side of AC signal and is used to reduce the conducted EMI generated by the power supply so as to ensure the functionality of the power supply 8. A rectifier circuit 82, converts the AC signal to the DC signal, for supplying the input signal to the load 9.

The emphasis on environmental protection awareness is gradually increasing, therefore, enhanced requirements for energy-saving power supplies have also been gradually implemented in various electronic products of everyday life. Regarding the aforementioned power supply, wherein the EMI filter 80 does not have the effect of saving power while its internal components consume power on condition that the AC signal is inputted to the EMI filter 80. Even though the load 9 coupled with the power supply 8 is in power saving mode, the EMI filter 80 fails to achieve the effect of reduction in power consumption, thereby wasting the power generated from the power supply 8. The aforementioned power supply 8 is obviously not in conformity with the requirements of current standards for environmental protection.

SUMMARY OF THE INVENTION

The objective of the present invention is to provide a power-saving control apparatus, a power supply, and a power-saving method for the power supply, so that the EMI filter of the power supply can attain the intended power-saving effects.

To achieve the aforementioned objectives, the present invention provides one embodiment which is a power-saving control apparatus, adapted for reducing power consumption of an EMI (Electromagnetic Interference) filter associated with a power-supply, comprising: a first rectifier circuit and a switching circuit. Therein, the first rectifier circuit is for rectifying an AC signal to a DC signal. The switching circuit is for controlling either the AC signal or the DC signal as an input signal to the EMI filter.

To solve the aforementioned technical issues, the present invention provides another embodiment which is a power supply comprising: an EMI filter, a power-saving control apparatus, and a second rectifier circuit. Therein, the EMI filter is coupled between the power-saving control apparatus and the second rectifier circuit. The power-saving control apparatus further comprises a first rectifier circuit and a switching circuit. The first rectifier circuit functions by rectifying an AC signal to a DC signal. The switching circuit functions by controlling either the AC signal or the DC signal as an input signal to the EMI filter.

In order to solve the aforementioned technical issues, the present invention provides another embodiment in the form of a power-saving method of a power supply, adapted for reducing power consumption of an EMI filter of the power supply, comprising the steps of: supplying a load coupled with the power supply to work in normal mode so as to control an AC signal transmitted to the EMI filter of the power supply; and supplying a load coupled with the power supply to work in power saving mode so as to control a DC signal transmitted to the EMI filter of the power supply.

Consequently, the following efficacy of aforementioned technical proposal of the present invention is achieved: when the EMI filter receives the DC signal, the capacitive reactance of an internal capacitor of the EMI filter is approaching infinity, thereby the power consumption of the EMI filter is approaching zero so as to reduce the power consumption of the power supply.

In order to further understand the techniques, means and effects the present invention takes for achieving the prescribed objectives, the following detailed description and included drawings are hereby referred, such that, through which, the purposes, features and aspects of the present invention can be thoroughly and concretely appreciated; however, the included drawings are provided solely for reference and illustration, without any intention to be used for limiting the present invention, whose full scope and dimension is described only in the later following claims.

DETAILED DESCRIPTION OF THE PREFERRED EMBODIMENTS

A major objective of the present invention is to provide an energy-saving power supply which can reduce the power consumption of the EMI filter without affecting the normal operations of power supply. As usual, the EMI filters of power supplies are implemented at the input side of AC signal, and the power consumption of the EMI filters are usually generated from the capacitive reactance, equivalent series resistance (ESR), coils, and losses of lines of the X/Y capacitors. Hence, the present invention functions primarily via controlling the capacitive reactance of capacitors which are approaching infinity, thereby reducing, progressively, the power consumption of capacitors as long as energy-saving performance is required. Consequently, the overall power consumption of the EMI filters is decreased and the power supply has achieved the objective in energy-saving.

Figure 1:
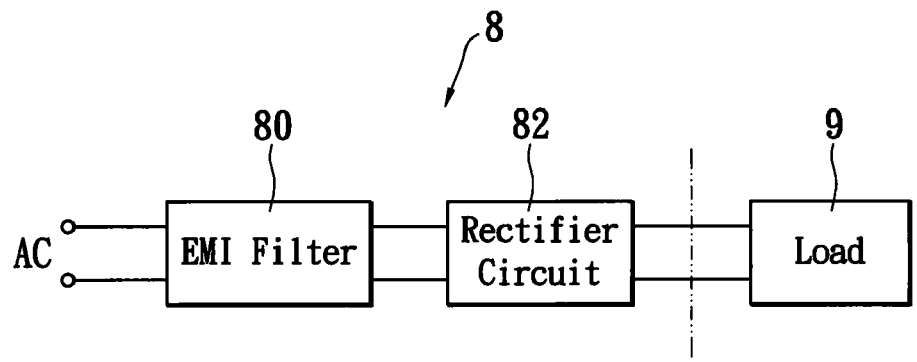
FIG. 1 illustrates a block diagram of the power supply in accordance with certain aspects of the prior art.
Figure 2:
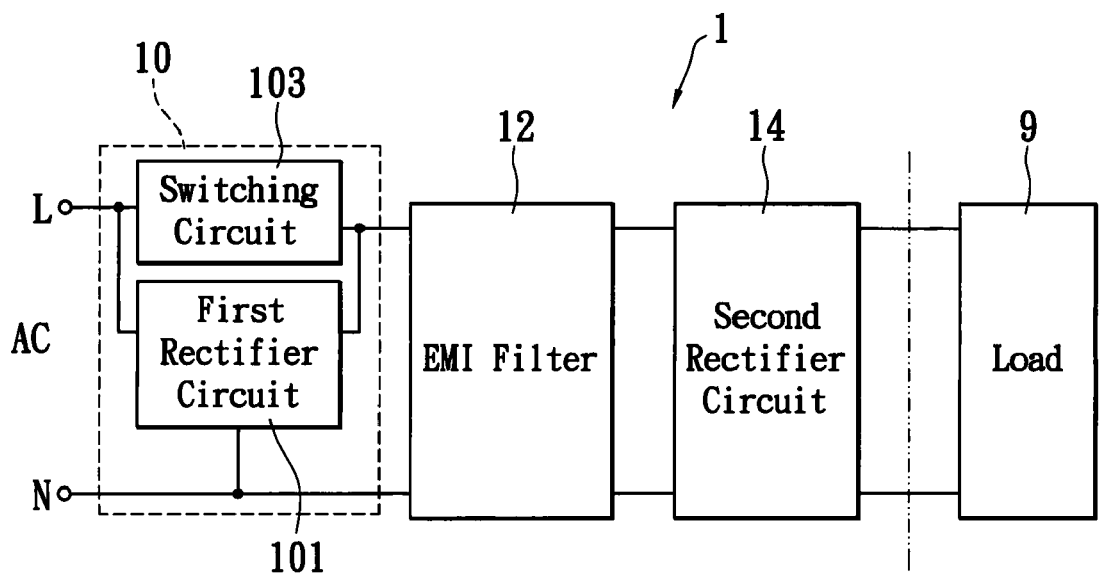
FIG. 2 illustrates a block diagram of a first embodiment of the power supply in accordance with certain aspects of the present technique.

First please refer to FIG. 2, in which a block diagram of a first embodiment of the power supply according to the present technique is shown. The power supply 1 includes a power-saving control apparatus 10, an EMI filter 12, and a second rectifier circuit 14. Therein, the power-saving control apparatus 10 is coupled between the EMI filter 12 and the input side of AC signal. The EMI filter 12 is coupled between the power-saving control apparatus 10 and the second rectifier circuit 14. The output side of second rectifier circuit 14 supplies electrical energy to a load 9. While the power supply 1 supplies electrical energy to the load, the operating status of load 9 can be used to determine whether the power supply 1 is supposed to operate either in normal mode or in power saving mode. As the operating status of load 9 demonstrated in the embodiment is in normal mode, the power supply 1 is correspondingly operating in normal mode. Also while the operating status of load 9 demonstrated in the embodiment is in power saving mode, the power supply 1 is respectively operating in power saving mode.

Since the technical characteristics of the EMI filter 12 and the second rectifier circuit 14 are well-known, the detailed descriptions are not required. With regard to the power-saving control apparatus 10 which is used to control the power supply 1 to operate in normal mode or in power saving mode, as shown in FIG. 2, it further comprises a first rectifier circuit 101 and a switching circuit 103. Therein, the first rectifier circuit 101 is for rectifying an AC signal which is inputted to the power supply 1 to a DC signal. The switching circuit 103 is for controlling the EMI filter 12 to receive either the AC signal or the DC signal which is rectified by the first rectifier circuit 101. The illustration of the switching circuit 103 is connected with the first rectifier circuit 101 in series as shown in FIG. 2, yet, the scheme of configuration are provided solely for convenience, reference, and illustration, without any intention to be used for limiting the present invention. For example, components can be connected in parallel.

Furthermore, the descriptions of operating principles of the power-saving control apparatus 10 are provided. The switching circuit 103 of the power-saving control apparatus 10 can be illustrated as a change-over switch. The functionality of the change-over switch is for controlling the input signal to the transmission path of EMI filter as either AC signal or DC signal. For example, the change-over switch is in conduction such that the AC signal is directly passing thru the change-over switch to the EMI filter 12. On the other hand, the change-over switch is in cut-off such that the DC signal rectified by the first rectifier circuit 101 is directly passing thru the change-over switch to the EMI filter 12. According to the operating status of the load 9, the change-over switch can be determined to be in conduction or in cut-off. For example, as the load 9 is operating in normal mode, the change-over switch is switched to status "on", therefore, as the load 9 is operating in power saving mode, the change-over switch is switched to status "off".

Consequently, as the EMI filter 12 receives the AC signal, its internal power consumption is generated from the capacitive reactance, equivalent series resistance (ESR), coils, and losses of lines of the X/Y capacitors. However, as the EMI filter 12 receives the DC signal, the capacitive reactance of X/Y capacitors is approaching infinity, thereby reducing the power consumption to almost zero. Thus, the power consumption of the EMI filter 12 has only generated from the coils and lines. As a result, the power consumption of EMI filter 12 generated as the DC signal is received is relatively smaller as the AC signal is received.

In other words, under the control of the power-saving control apparatus 10 of the power supply 1, it can achieve the objective of power-saving when the EMI filter 12 receives the DC signal and the power supply 1 is still supplying electrical energy to the load 9. If the power supply 1 wants to be in normal mode, the switch circuit 103 of the power-saving control apparatus 10 can be controlled to be in conduction status.

Figure 3:
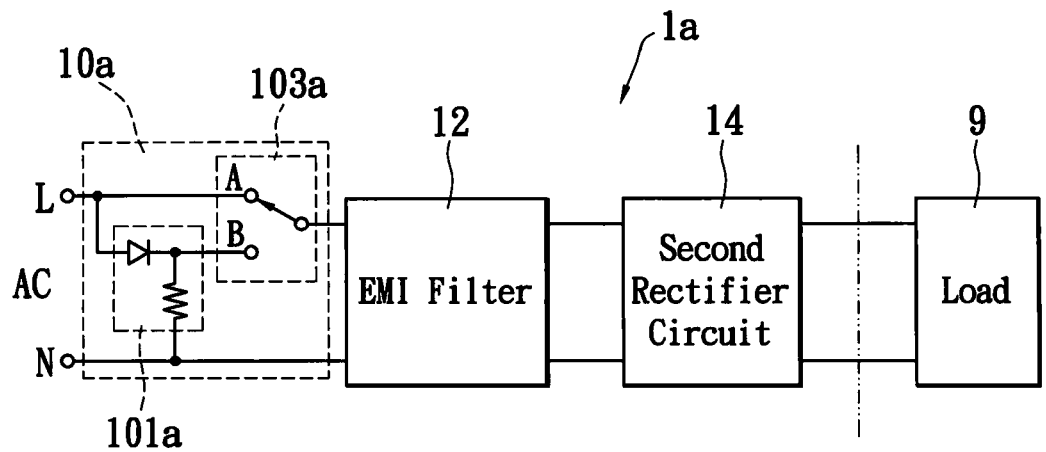
FIG. 3 illustrates a block diagram of a second embodiment of the power supply in accordance with certain aspects of the present technique.

Please refer to FIG. 3, in which a block diagram of a second embodiment of the power supply according to the present technique is shown. The power supply 1*a* comprises a power-saving control apparatus 10*a*, an EMI filter 12, and a second rectifier circuit 14. The technical characteristics and specifications of the power supply 1*a* are exactly the same as FIG. 2 except for the configuration of a first rectifier 101*a* and a switching circuit 103*a* within the power-saving control apparatus 10*a*. Therefore, according to the illustration of the power-saving control apparatus 10*a*, the switch circuit 103*s* can be considered as a change-over switch. The change-over switch can be in short at point A or in short at point B so as to input either the AC signal passing thru the transmission path of point A or the DC signal passing thru the transmission path of point B to the EMI filter 12. For example, as the load 9 is operating in normal mode and the change-over switch is in short at point A, the AC signal transmits directly to the EMI filter 12. Thus, as the load 9 is operating in power saving mode and the change-over switch is in short at point B, the DC signal rectified by the first rectifier circuit 101*a* transmits directly to the EMI filter 12. The illustration of the first rectifier 101*a* is a half-wave rectification circuit as shown in FIG. 3.

Figure 4:
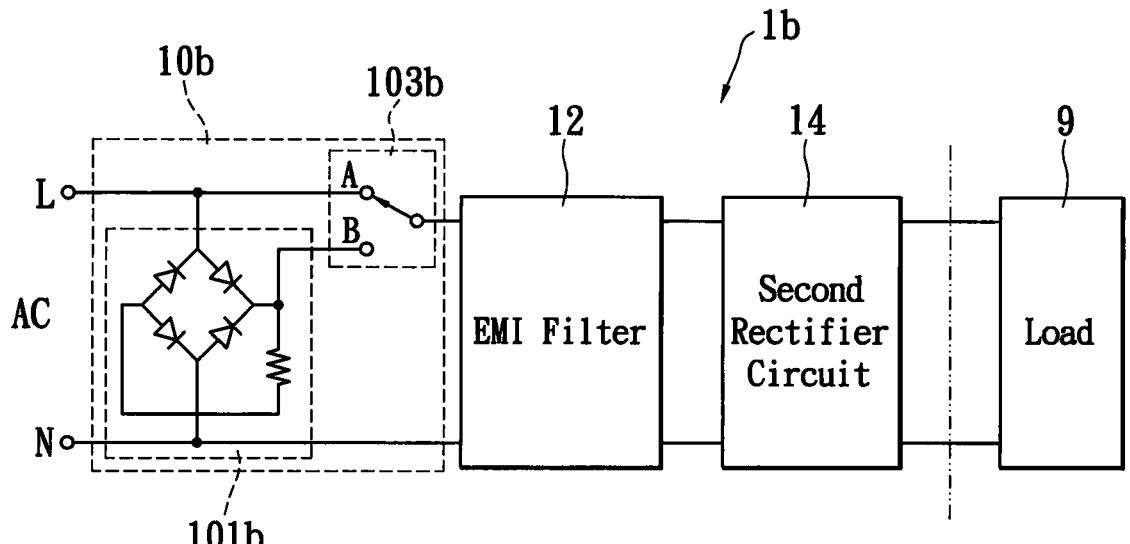
FIG. 4 illustrates a block diagram of a third embodiment of the power supply in accordance with certain aspects of the present technique.

Furthermore, please refer to FIG. 4, in which a block diagram of a third embodiment of the power supply according to the present technique is shown. The power supply 1*b* comprises a power-saving control apparatus 10*b*, an EMI filter 12, and a second rectifier circuit 14. The technical characteristics and specifications of the power supply 1*b* are exactly the same as FIG. 3 except that the configuration of the first rectifier 101*b* is a full-wave rectification circuit (Bridge Rectifier Circuit). Therein, the input signal to the EMI filter 12 is determined from either the AC signal transmitted thru the transmission path of point A or the DC signal transmitted thru the transmission path of point B by the switch circuit 103*b*.

With regards to the aforementioned actual operations of the switching circuit, it can be carried out thru the automatic switching operations. For example, the switching status of change-over switch is monitored according to the retrieval of control signal by the switching circuit. The change-over switch status itself can be in conduction or in cut-off as shown in FIG. 2, or in short circuit at point A or at point B as shown in FIG. 3 and FIG. 4. The control signal can be the output signal when the load is in power saving mode. Therefore, the operating status of load is with respect to the control signal retrieval by the switching circuit. As a result, the control signal generated by the load in power saving mode is received by the switching circuit which can enable the connection between the transmission path of DC signal to the input side of EMI filter; the control signal is not received by the switch circuit which can enable the connection between the transmission path of AC signal to the input side of EMI filter.

Figure 5:
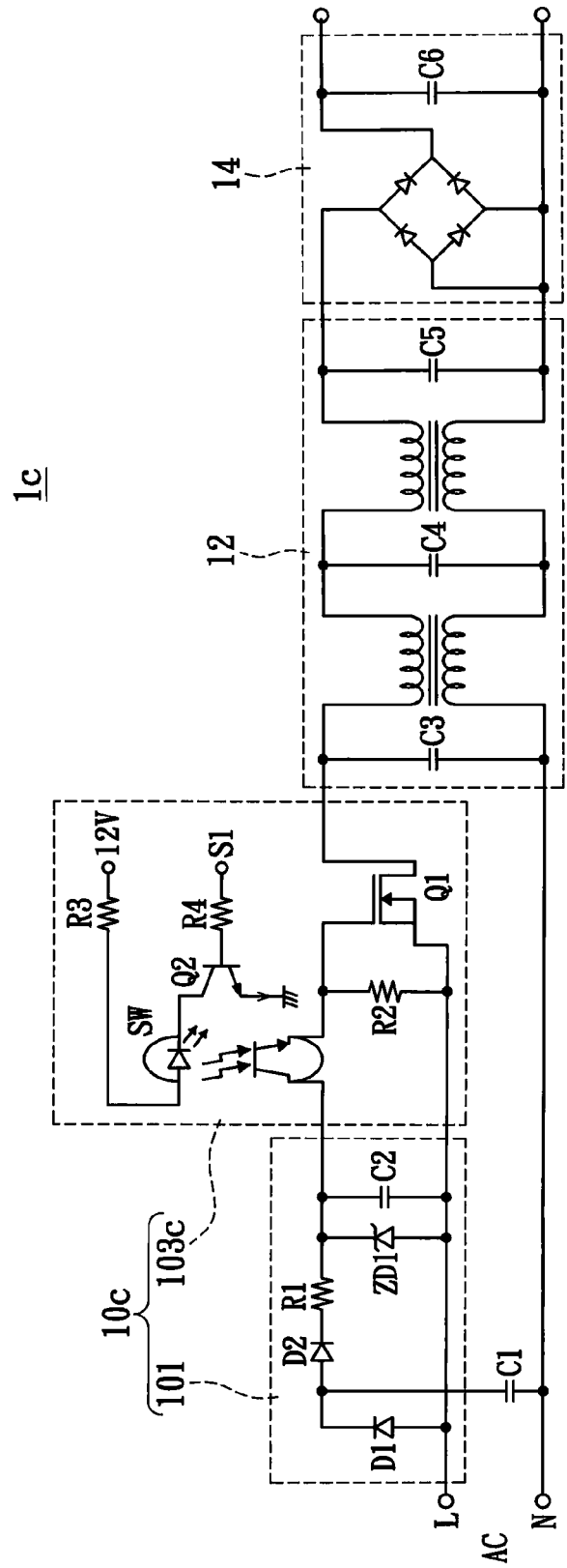
FIG. 5 illustrates a circuitry of a fourth embodiment of the power supply in accordance with certain aspects of the present technique.

Finally, please refer to FIG. 5, in which a block diagram of a fourth embodiment of the power supply according to the present technique is shown. The power supply 1*c* includes a power-saving control apparatus 10*c*, an EMI filter 12, and a second rectifier circuit 14. The power-saving control apparatus 10*c* is coupled between the EMI filter 12 and the input side of AC signal. The EMI filter 12 is coupled between the power-saving control apparatus 10*c* and the second rectifier circuit 14 so that the output side of second rectifier circuit 14 supplies electrical energy to a load 9. The power-saving control apparatus 10*c* further comprises a first rectifier circuit 101 and a switching circuit 103*c*. The first rectifier circuit 101 includes a plurality of diodes D1~D2, a resistor R1, a TVS diode ZD1, and a capacitor C2. The switching circuit 103*c* includes a plurality of resistors R2~R4, a plurality of transistors Q1~Q2, and a change-over switch SW.

As per the aforementioned fourth embodiment, the resistors R3 R4 and the transistor Q2 of the switching circuit 103*c* are considered as a driver circuit, so that to control the conduction and cut-off of the change-over switch which is illustrated as a optical coupler. Therefore, as the diver circuit receives the control signal which demonstrated that the load 9 is in power saving mode, Both of the transistor Q2 and the optical coupler are in conduction such that the DC signal rectified by the first rectifier circuit 101 can pass thru the optical coupler and the transistor Q2 to the EMI filter 12; as the driver circuit doesn't receive the control signal, the transistor Q2 and the optical coupler are in cut-off such that the AC signal instead of DC signal rectified by the first rectifier circuit 101 can pass thru the optical coupler and the transistor Q2 to the EMI filter 12.

In the aspects of the aforementioned embodiments, the technical characteristic of the present invention are reducing the power consumption of the EMI filter generated by controlling the DC signal as the input signal to the EMI filter, thereby achieving the objective of power-saving. And the present invention is via the switching circuit as a change-over switch to control respectively the connection of the EMI filter to either the transmission path of DC signal or the transmission path of AC signal.

As per the aforementioned embodiments, the switching status of the switching circuit can also be operated by hand, and the change-over switch can be an electronic switch or a mechanical switch.

Furthermore, the load of aforementioned power-saving control apparatus is primarily operating in power saving mode, so that the power supply enables the energy saving operation with low power output, thereby achieving the effect for decreasing the power consumption of the EMI filter. On the other hand, the load of power-saving control apparatus is operating in normal mode, so that the power supply maintains the normal operation with high power output so as to provide normal performance of EMI elimination by the EMI filter.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. A power-saving control apparatus adapted for reducing power consumption of a power supply, comprising:
   a first rectifier circuit for rectifying an alternating current (AC) signal to a direct current (DC) signal; and
   a switch circuit, in response to a generation of a control signal from the power supply, for selecting either the AC signal or the DC signal as an input signal to an EMI filter;
   wherein, the switch circuit, depending on whether a load coupled to the power supply operates in a normal mode or in a power saving mode, selects either the AC signal or the DC signal as the input signal to the EMI filter.

2. The power-saving control apparatus according to claim 1, wherein the first rectifier circuit is a half-wave rectification circuit or a full-wave rectification circuit.

3. The power-saving control apparatus according to claim 1, wherein the switch circuit is a change-over switch for facilitating either a transmission path of AC signal or a transmission path of DC signal to the EMI filter.

4. The power-saving control apparatus according to claim 3, wherein the switch circuit is an electronic switch or a mechanical switch.

5. The power-saving control apparatus according to claim 3, wherein the switch circuit outputs the DC signal or the AC signal to the EMI filter depending on whether the switch circuit receives the control signal or not.

6. The power-saving control apparatus according to claim 5, wherein the switch circuit further comprises:
   a driver circuit, coupled with the change-over switch, for controlling a conduction of the change-over switch according to whether the control signal is received by the switch circuit.

7. The power-saving control apparatus according to claim 3, wherein the change-over switch is an electronic switch or a mechanical switch.

8. A power supply, comprising:
   an EMI filter;
   a power-saving control apparatus, comprising:
      a first rectifier circuit for rectifying an alternating (AC) signal to a direct current (DC) signal; and
      a switch circuit, in response to a control signal generated by the power supply, for selecting either the AC signal or the DC signal as an input signal to the EMI filter; and
   a second rectifier circuit, coupled with the EMI filter, for rectifying an output signal of EMI filter as an input signal to a load;
   wherein, the load coupled to the power supply operates in a normal mode or in a power saving mode, the control signal controls the switch circuit to select the AC signal or the DC signal as the input signal to the EMI filter.

9. A power-saving method of a power supply as recited in claim 8, comprising:
   the power supply operating under the power-saving mode being controlled by the power-saving control apparatus when the power supply receives AC signals, and turns off the switch circuit; and
   otherwise, the switch circuit being turned on with discharging a capacitor within the EMI filter when the power supply does not receive the AC signals.

10. A power-saving method of a power supply adapted for reducing power consumption of an EMI (Electromagnetic Interference) filter of the power supply, comprising the steps of:
   when a load coupled with the power supply operates in a normal mode controlling an alternating current (AC) signal to be transmitted to the EMI filter of the power supply via a switch circuit which facilitates a transmission path of the AC signal to the EMI filter; and
   when the load coupled with the power supply operates in a power saving mode controlling a direct current (DC) signal to be transmitted to the EMI filter of the power supply via the switch circuit which facilitates a transmission path of DC signal to the EMI filter, wherein the DC signal is rectified from the AC signal.

* * * * *